J. W. SHEARD & J. DONE.

BEARING.

No. 11,630. Reissued Sept. 21, 1897.

Witnesses

R. H. Kimber

Fred. J. Shaw

Inventors

J. W. Sheard

J. Done

By their Attorney

Wm N Ivans

UNITED STATES PATENT OFFICE.

JOHN WILLIAM SHEARD AND JOHN DONE, OF BLACKPOOL, ENGLAND, ASSIGNORS OF ONE SEVENTY-SEVENTH TO WILLIAM BOWKER, OF WALTHAM, MASSACHUSETTS.

BEARING.

SPECIFICATION forming part of Reissued Letters Patent No. 11,630, dated September 21, 1897

Original No. 575,855, dated January 26, 1897. Application for reissue filed May 20, 1897. Serial No. 637,415. Patented in England August 24, 1894, No. 16,114, and in Canada April 27, 1896, No. 52,109.

*To all whom it may concern:*

Be it known that we, JOHN WILLIAM SHEARD and JOHN DONE, of Blackpool, in the county of Lancaster, England, have invented certain new and useful Improvements in Bearings, (for which we have already obtained Letters Patent of Great Britain, dated August 24, 1894, and numbered 16,114, and Letters Patent of the Dominion of Canada, dated April 27, 1896, and numbered 52,109,) of which the following is a specification, reference being had to the accompanying drawings, forming a part thereof, in which similar letters of reference indicate corresponding parts.

This invention relates to bushings or linings for wheels, cylinders, journal-boxes, pulleys, &c.; and it consists of a number of small segmental pieces or strips of iron, steel, brass, gun-metal, bronze, or any other metal or composition of metals made up into the required form or forms, as hereinafter described.

The invention is fully described in the following specification, of which the accompanying drawings form a part, in which—

Figure 1:
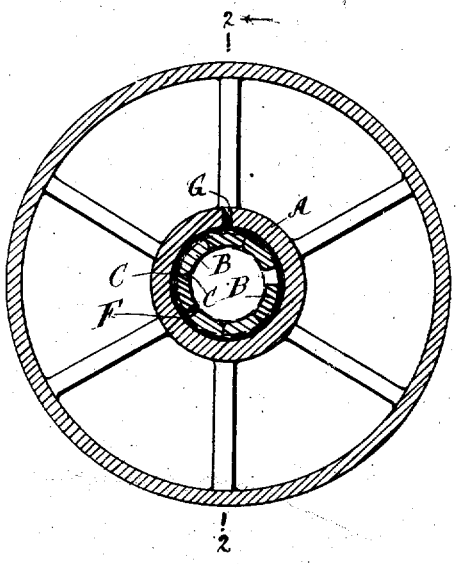
Figure 2:
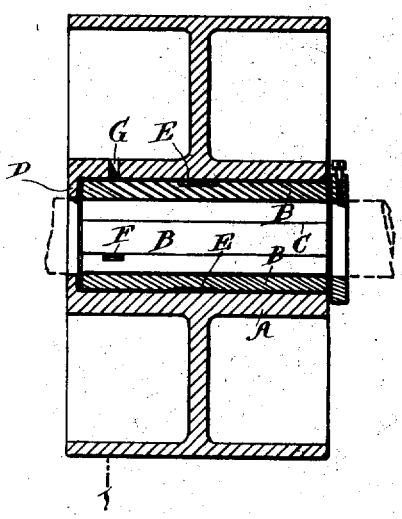

Figure 1 is a transverse section of a pulley provided with our improved bushing or lining; and Fig. 2, a longitudinal sectional view thereof, taken on line 2 2, Fig. 1.

Our improvement differs from the ordinary bushing consisting of brasses or similar devices in that the brasses are done away with and the segmental pieces are placed around the shaft or in the bush of the pulley-wheel or cylinder, the segments forming a more or less broken circle or annulus and one or more straps being employed, where required, though not in all cases, to keep the segments in position.

Referring to Fig. 1 of the drawings, A designates the body or hub of a pulley, and B the segmental sections of our improved bushing, all of which segments are substantially uniform in cross-section and each free and independent of the others and having smooth adjacent edges adapted to come in free contact with the edges of the adjoining strips, C C being longitudinal recesses for oil, employed or formed where and when necessary and preferably on both the inner and outer sides of the bushing or lining.

The annular collar or centripetal projection D (shown in Fig. 2) is designed to keep the segments from working out or moving longitudinally, and a band E is also preferably employed to keep the segments in position when filling.

The longitudinal recesses C C for oil or other lubricant are also shown in Fig. 2, and a small opening or perforation F for conveying the lubricant from the outer to the inner surface of the bushing, it being understood that these recesses C and the small opening are in communication with passages or perforations in the body or hub A of the pulley in the usual manner, as indicated at G, through which the oil may be supplied in the customary way.

In the case of an ordinary bearing the inside of the pedestal, cylinder, or other body can be bored out and faced to provide a recess for the segments, or the segments can be fitted to any style of ordinary bearing, and the raised annular projections or shoulders D keep the segments in position, and in the case of a loose pulley or similar device the segmental pieces form the bush or bearing and are held in place by an ordinary collar, and when the shaft or loose pulley revolves the friction will cause the segmental pieces to revolve also, but at a much slower speed.

The combined circumferential width of the segmental strips B is such as not to completely line the pedestal or form a complete annulus or circle, but so as to leave a space or clearance between them which serves to prevent them from binding and enables them to act freely. By this construction when a shaft is mounted to revolve within the pedestal the friction between it and the segmental strips B will cause the latter to revolve also, but at much less speed.

What we claim is as follows:

1. A bushing for pulleys, wheels and cylinders, consisting of a series of segmental strips, each free and independent of the others and adapted to be held endwise in place, but so as to be free to rotate about the shaft or other body against which they bear, with means for so confining said strips, substantially as herein described.

2. A bushing for pulleys, wheels and cylinders consisting of a series of segmental strips, each free and independent of the others and having smooth adjacent edges adapted to come in free contact with the edge of the adjoining strips, and all held endwise in place and free to be rotated about the shaft or other body against which they bear, with means for so confining said strips, substantially as described.

3. A bushing for pulleys, wheels, and cylinders, consisting of a series of segmental strips all substantially uniform in cross-section and adapted to freely rotate about the shaft or other body against which they bear, and each strip having smooth adjacent edges adapted to come in free contact with the edges of the adjoining strips and being of such transverse width that the combined circumferential width of the series will not completely surround said shaft, and means for retaining the strips endwise against longitudinal displacement, substantially as shown and described.

4. A bushing for pulleys, wheels, and cylinders, consisting of a series of segmental strips all substantially uniform in cross-section and adapted to freely rotate about the shaft or other body against which they bear, and each strip having smooth adjacent edges adapted to come in free contact with the edges of the adjoining strips, and being of such transverse width that the combined circumferential width of the series will not completely surround said shaft, there being longitudinal recesses C C for the lubricant, and means for retaining the strips endwise against longitudinal displacement, substantially as shown and described.

5. A bushing for pulleys, wheels, and cylinders, consisting of a series of segmental strips all substantially uniform in cross-section and each having smooth adjacent edges bearing against the edges of the adjoining strips, two of such strips having the adjacent outer and inner longitudinal corner edges beveled to form recesses C, C, extending longitudinally between such two strips, there being an inlet-opening F formed in the edge of and extending through another strip, and a band E encircling such strips, the whole in the form of a circle and adapted to be arranged within an encircling pulley-hub formed with a centripetal projection or shoulder D, against which the ends of the strips abut and also having a lubricating-passage with which the recesses C C and opening F communicate, for the purpose set forth.

JOHN WILLIAM SHEARD.
JOHN DONE.

Witnesses:
YATES WILLIAM BOOTH,
F. FRIEDENSHAL.